Oct. 1, 1963

J. W. MAUCHLY 3,105,955

ERROR CHECKING DEVICE

Filed March 28, 1956

INVENTOR.
JOHN W. MAUCHLY

BY Charles C. English
AGENT

3,105,955
ERROR CHECKING DEVICE

John W. Mauchly, Ambler, Pa., assignor to Sperry Rand Corporation, New York, N.Y., a corporation of Delaware Filed Mar. 28, 1956, Ser. No. 574,546
7 Claims. (Cl. 340—146.1)

This invention relates to an error checking device which is capable of checking for malfunctioning of electronic equipment utilizing electrical pulse patterns of a repetitive or cyclic nature. Its purpose is to examine for transient or steady-state errors in the pulse pattern, and to give an indication of such an occurrence. Upon detecting an error the checking device generates a signal that may be used in a variety of ways, such as activation of an aural or visual alarm, or interruption of the operation of the equipment, or if desired a combination of these. The manner in which the invention accomplishes the checking function will be demonstrated in detail hereinafter.

The invention has a wide scope of application in connection with electronic equipment utilizing pulses. As an example, consider an electronic digital computer. In such a device certain timing pulse patterns must be generated repetitively. These pulse patterns may be generated by a clock pulse generator which is utilized to maintain synchronization of the many otherwise independent portions of the computer. It is highly desirable and frequently mandatory to check such a generator for failue since the loss of one or more timing pulses will at best severly interfere with proper functioning and render the computer completely unreliable. One method of checking such a pulse generator would be to provide a duplicate generator producing the same pulse pattern and compare the duplicate generator pattern against that of the primary generator. This method could be used to check all components of the computer and, of course, carrying this porcedure to its ultimate conclusion one would have two complete computers, one of which merely checked the other. This duplication method has been used in varying degrees, but it suffers from at least two major drawbacks. Firstly, it is highly uneconomic. It will be readily appreciated that the initial cost of such a computer will reflect the inclusion of the additional checking equipment and that there will be additional space and maintenance requirements. Secondly, the duplication method is sometimes self-defeating. Certainly, if the primary equipment is subject to failure, the duplicate checking equipment is likewise subject to failures of the same type and with the same frequency of occurrence. Additionally, failure of the duplicate checking equipment will generally be indistinguishable from failure of the primary equipment with the result that a failure indication may be obtained when in fact there is no failure of the primary equipment.

The present invention suffers from neither of the aforementioned disadvantages. It is comparatively small, simple and inexpensive, and the embodiment of the invention can be in either active or passive form. A passive device, of course, will reduce the required additional maintenance to practically the vanishing point, thereby minimizing the probability of erroneous indications of primary equipment failure. It is therefore an object of this invention to provide an improved error checking device for electronic equipment utilizing electrical pulse patterns of a repetitive or cyclic nature.

A second object of this invention is to provide an improved error checking device which is small, simple and inexpensive.

Another object of this invention is to provide an improved error checking device of a highly reliable nature which requires a minimum of maintenance.

Other objects will become apparent from a reading of the specification in conjunction with the drawings wherein.

Like numerals are used to indicate like elements in the several figures.

This invention accomplishes transient error checking by making use of the repetitive or cyclic nature of a pulse pattern. Instead of utilizing duplicate generating equipment to provide a checking pulse pattern, the pulse pattern is checked against itself. That is, the output of the pulse pattern generator during one cycle is compared with its output during some preceding cycle, usually the immediately preceding one. This is achieved by storing the preceding cycle as a reference pattern for comparison with the cycle that follows. A suitable storage device for example may be an electrical or acoustical delay line, in which signals inserted at the input end will not appear at the output terminal of a predetermined length of time equal to one complete cycle of the pattern. The comparing circuit may be of any type producing an output pulse as a result of non-coincident input pulses.

Figure 1:
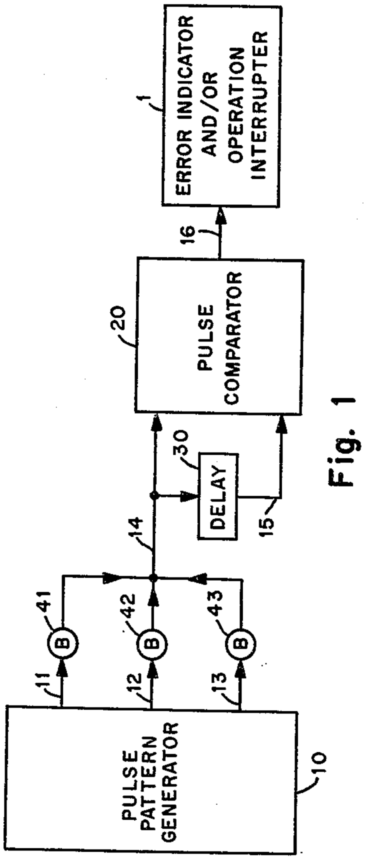
FIG. 1 is a block diagram of an embodiment of the invention.
Figure 3:
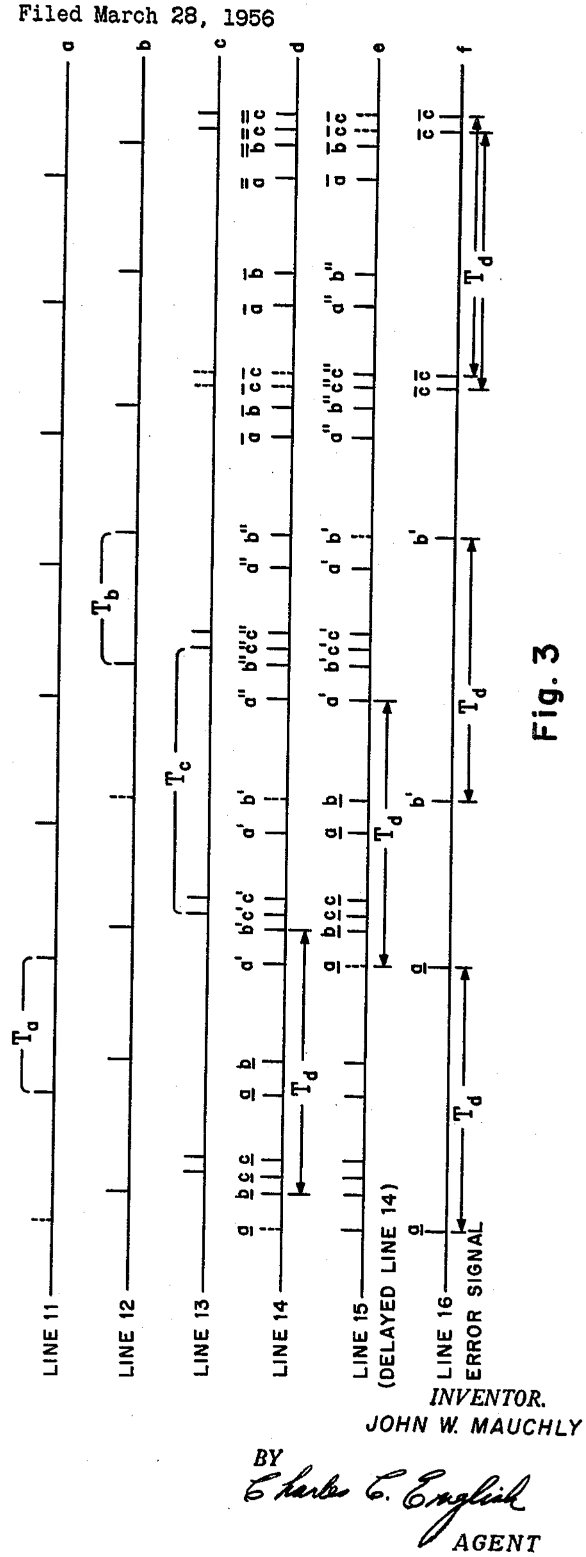
FIG. 3 is a timing diagram for the block diagram of FIG. 1 showing the pulse patterns on each signal line.

A complete understanding of the inventon will be most easily had by referring to the circuit of FIG. 1 in conjunction with the timing diagram of FIG. 3.

FIG. 1 shows a pattern generator 10 having three signal output lines 11, 12 and 13 which are respectively connected together and to line 14 through buffers 41, 42 and 43. The lines 11, 12 and 13 contain specific, time related, recurrent pulse patterns which are combined to form a single composite recurrent pattern on line 14. The three output lines 11, 12 and 13 are merely illustrative, and in no way represent an inherent limitation of the invention. Any number of such lines may be employed consistent with good engineering practice. The buffers are used to isolate the signal lines from each other, thereby preventing interaction.

Line 14 is connected to the first input of a comparator circuit 20 and also to the input of a delay device 30. The output of comparator 20 is connected to an indicating device 1 via line 16. The output of delay device 30 is connected to the second input of comparator 20 via line 15 and provides a predetermined fixed time-delay to the recurrent composite pulse pattern on line 14 before allowing such pattern to be presented at the second comparator input. The delay introduced by delay device 30 will be the time equivalent of "N" cycles of the recurrent composite pulse pattern on line 14, and "N" will generally be chosen as equal to one. Therefore, when no errors have occurred, the delayed and undelayed inputs to the comparator will be identical and no output pulse will appear on line 16. When, however, an error occurs, the delayed and undelayed inputs to the comparator will be different, and the comparator will generate a signal which will appear on line 16. The difference between the inputs arises because the error bearing signal on line 14 is at first presented to one comparator input only, the undelayed input, while the signal presented to the other comparator input, the delayed input, is the stored signal from the preceding cycle, a non-error bearing signal. It will be appreciated, of course, that error signals will be generated when the pulse source being checked is first started since there are no pulses stored in the delay device. These first signals should be ignored or rendered incapable of operating the indicating device.

When multiple pulse patterns are buffed together as depicted in FIG. 1, care should be exercised to insure that a pulse does not exist on more than one of the lines 11, 12, 13 at a specific time. This is mandatory, because if such condition existed certain errors would go undetected. As an example, consider that the pulse patterns on lines 11 and 12 both contain a pulse occurring at a time *t*. The composite pattern appearing on line 14 will also contain a pulse occurring at time *t*. If, however, a failure occurred in the time *t* pulse of either line 11 or line 12, but not both, then the composite pattern on line 14 would still contain the time *t* pulse and the error would go undetected.

The pattern generator 10 may be a generator specifically designed to provide timing pulses, such as the clock pulse generator of a digital computer. Alternatively, the pattern generator 10 may not exist as an individual component, but the lines 11, 12 and 13 may correspond to several time related pulse generators within a machine which it is desirable to monitor. In such a case, however, each of these generators must either normally produce no pulses whatever or must produce pulses in a cyclic pattern, such patterns being related to each other by the same recurrence period. The buffers 41, 42 and 43 may be diodes or any other well known device suitable to provide an isolation function. The delay device 30 may be one of the many types of delay line commonly encountered in electronic equipment, or it may be an acoustical device such as a mercury tank, or any other mechanism suitable for delaying electrical pulses. An example of a delay device 30, which may be used to delay a series of pulse signals, is described in a patent issued to J. P. Eckert, Jr. et al., entitled "Memory System," Patent Number 2,629,827, issued February 24, 1953. The indicating device 1 may be any of the well known mechanisms for giving an aural or visual alarm, or for interrupting the equipment operation. One method of indication would be to utilize the pulse generated by the error detector to activate a holding relay or electronic trigger circuit which would, in turn, light a signal lamp for example. The comparator 20 is a pulse comparing device which produces an output signal upon the receipt of non-coincident input signals. It should be kept clearly in mind that the use of phase detectors, as for example the F.M. discriminator, is not contemplated herein, and is in fact actually undesirable. Phase detectors generally are utilized to detect slow changes in a desired constant condition, such as deviation of a beat frequency due to local oscillator drift. Further, the detected change is normally used as a correction signal in servomechanism or automatic frequency control circuits. No such functions are contemplated herein, the sole function required of the comparator is the differentiation between coincident and non-coincident input pulses without regard to slight phase shift.

Figure 2:
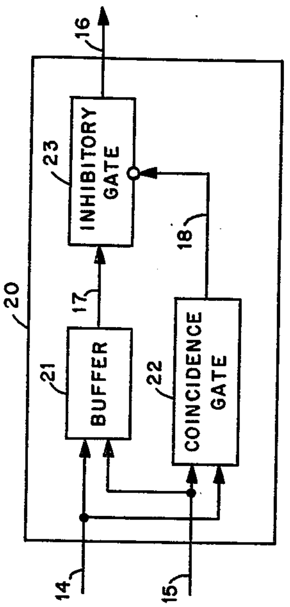
FIG. 2 illustrates one form of the pulse comparator shown in FIG. 1.

Before describing the invention as shown in the embodiment of FIG. 1, it will be conducive to a more complete understanding to first describe the operation of a typical pulse comparator 20 illustrated in detail in FIG. 2.

FIG. 2 illustrates one possible comparator circuit. Input lines 14 and 15 to comparator 20 each go to one of two inputs or buffer 21 and coincidence gate 22. Output line 17 of buffer 21 and output line 18 of coincidence gate 22 constitute the input lines to inhibitory gate 23, while line 16 is the output from this last named gate. Buffer 21 and gates 22 and 23 are all well known devices and any of the many types may be used to perform the logical functions indicated. Briefly, the circuit operates in the following way. Buffer 21 will produce a pulse on line 17 if a pulse appears on either or both of lines 14 and 15. Coincidence gate 22 will produce a pulse on line 18 only if pulses appear simultaneously on lines 14 and 15. Inhibitory gate 23 will produce a pulse on line 16 only if a pulse appears on line 17 and no pulse appears on line 18. Three possible signal conditions can exist with respect to lines 14 and 15. These are, a pulse on line 14 and no pulse on line 15; no pulse on line 14 and a pulse on line 15; pulses on both line 14 and line 15.

If a pulse appears on line 14 but not on line 15, such pulse will pass buffer 21 to the input of gate 23 via line 17. Since only the line 14 input to gate 22 is energized, gate 22 will not produce a signal on line 18, the inhibiting input to gate 23. Gate 23 being uninhibited, the input signal on line 17 will pass through to output line 16. It is apparent that the same operation will occur when a pulse appears on line 15 but not on line 14. When, however, pulses appear on both lines 14 and 15 coincidence gate 22 will produce a pulse on line 18 and inhibit gate 23. The pulse appearing on line 17 via buffer 21 cannot pass through gate 23 to output line 16.

In summary, the coincidence of pulses on lines 14 and 15 will produce no pulse on output line 16 while the occurrence of a pulse on either line 14 or 15 will produce a pulse on output line 16.

Referring now to the waveforms of FIG. 3 in conjunction with the circuit of FIG. 1, it will be seen that the individual pulse patterns on lines 11, 12 and 13 of FIG. 1 are represented by FIGS. 3*a*, 3*b* and 3*c* respectively. These three patterns have been combined in FIG. 3*d* to illustrate the composite pulse pattern on line 14. Each pulse in the composite pattern of FIG. 3*d* is designated by a letter to identify the individual pulse pattern source. That is, an "*a*" designation indicates that the pulse belongs to the pattern of FIG. 3*a*, and similarly for the "*b*" and "*c*" designations. Superscripts and subscripts have also been utilized to more easily identify the pulses comprising a particular cycle of the composite pulse pattern. This aids in comparing FIGS. 3*d* and 3*e*. FIG. 3*e* represents the delayed line 14 signal appearing on line 15, and, as is seen, illustrates FIG. 3*d* shifted to the right by an amount equal to one composite pulse group period. Additionally, the symbol T indicates the periodicity of each pulse pattern, $T_a$, $T_b$ and $T_c$ corresponding respectively to the periods of the pulse patterns of FIGS. 3*a*, 3*b* and 3*c*. $T_d$ corresponds to the period of the composite pulse pattern shown in FIGS. 3*d* and 3*e* and is equal to the time delay introduced by delay device 30 of FIG. 1. $T_d$ is also illustrated in connection with FIG. 3*f* which indicates the error signal appearing on line 16 when the two input signals to the comparator 20 differ, these input signals of course being those illustrated in FIGS. 3*d* and 3*e*.

Assume that no errors have occurred in any of the patterns up to the present time and then that one cycle errors occur to the $\underline{a}$, $\underline{b}$ and $\underline{c}$ pulses in the order and in the manner indicated. The pulse group stored in delay device 30 therefore, is that shown as the first six pulses of FIG. 3*e*. As each of these pulses appears on line 15 a corresponding pulse should appear on line 14. However, it will be seen from FIG. 3*d* that the first $\underline{a}$ pulse of the $\underline{a}$ $\underline{b}$ $\underline{c}$ group on line 14 is missing. Therefore, a non-coincidence condition exists at the comparator input terminals and an $\underline{a}$ error pulse is generated on line 16, as shown in FIG. 3*f*. A second $\underline{a}$ error signal will be generated on line 16 one composite-pulse-pattern period later, $T_d$. This occurs because the $\underline{a}$ $\underline{b}$ $\underline{c}$ group appearing on line 15 after being delayed in delay device 30 has the first *a* pulse missing, and the first *a′* pulse of the new *a′ b′ c′* pulse group is present on line 14. The first error signal of a second pair of error signals will be initiated by the last $\underline{b}$ pulse of the $\underline{a}$ $\underline{b}$ $\underline{c}$ pulse group on line 15 because the last *b′* pulse of the *a′ b′ c′* pulse group on line 14 is missing. The second *b′* error signal of this pair will occur $T_d$ later by virtue of the presense of the last $b''$ pulse of the $a''$ $b''$ $c''$ pulse group on line 14 and the absence of the last $b'$ pulse on line 15. The generation of two pairs of $\bar{c}$ error signals is also illustrated by FIGS. 3*d*, 3*e* and 3*f*. The error pulses on output line 16 are utilized to activate error indicator 1.

While a specific embodiment has been described to illustrate the principles of the invention, many modifications and variations for applying such principles in other arrangements, but which do not depart from the spirit of the invention, will be apparent to those skilled in the art.

What is claimed is:

1. In an error checking device, a source of periodic pulse pattern of digital signal groups, a dynamic delay device operatively coupled to said source, said delay device having a delay equal to an integral number of periods of said periodic pulse pattern of digital signal groups, and a digital pulse comparing device having first and second input circuits and an output circuit, said digital pulse comparing device including an exclusive-or gate circuit, operative to deliver an output signal upon the occurrence of anti-coincidence of pulse signals to the respective input circuits of said digital pulse comparing device, said first input circuit receiving signals from said delay device and said second input circuit receving signals from said source of periodic pulse pattern of digital signal groups.

2. In an error checking device, a plurality of signal generators the outputs of which are combined to produce a composite source of periodic pulse pattern of digital signal groups, a dynamic delay device operatively coupled to said source, said delay device having a delay equal to an integral number of periods of said periodic pulse pattern of digital signal groups, and a digital pulse comparing device having first and second input circuits and an output circuit, said digital pulse comparing device including an exclusive-or gate circuit operative to deliver an output signal upon the occurrence of anti-coincidence of pulse signals to the respective input circuits of said digital pulse comparing device, said first input circuit receiving signals from said delay device and said second input circuit receiving signals from said source of periodic pulse pattern of digital signal groups.

3. A source of periodic pulse pattern of digital signal groups subject to undesired signal variations, a dynamic delay device operatively coupled to said source, said delay device having a delay equal to an integral number of periods of said periodic pulse pattern of digital signal groups, a digital pulse comparing device having first and second input circuits and an output circuit, and a pulse activated indicating device operatively coupled to said digital pulse comparing device output circuit, said digital pulse comparing device including an exclusive-or gate circuit operative to deliver an output signal upon the occurrence of anti-coincidence of pulse signals to the respective input circuits of said digital pulse comprising device, said first input circuit receiving signals from said delay device and said second input circuit receiving signals from said source of periodic pulse pattern of digital signal groups, said indicating device being activated by a pulse from said comparing device output circuit.

4. In an error checking device a source of periodic pulse pattern of digital signal groups, delay means for delaying pulses having a delay equal to one period of said periodic pulse pattern, means including a digital comparator circuit operative to compare the signals from said source and said delay means, said digital comparator including an exclusive-or circuit operative to produce an output signal in response to anti-coincidence of pulses in the same relative positions of pulses from said delay means and said source.

5. In an error checking device, a plurality of signal generators the outputs of which are combined to produce a composite source of periodic pulse pattern of digital signal groups, delay means for delaying pulses having a delay equal to one period of said periodic pulse pattern, means including a digital comparator circuit operative to compare the signals from said composite source and said delay means, said digital comparator including an exclusive-or gate circuit operative to produce an output signal in response to anti-coincidence of pulses in the same relative positions of pulses from said delay means and said composite source.

6. In an error checking device a source of periodic pulse pattern of digital signal groups, delay means for delaying pulses having a delay equal to one period of said periodic pulse pattern, means including a digital comparator circuit operative to compare the digital signals from said source and said delay means, said digital comparator including an exclusive-or circuit operative to produce an output signal in response to anti-coincidence of pulses in the same relative positions of pulses from said delay means and said source, an indicator device coupled to said comparator circuit and being activated by an output signal therefrom.

7. In an error checking device a source of periodic pulse pattern of digital signal groups, delay means for delaying pulses having a delay equal to one period of said periodic pulse pattern, means including a digital comparator circuit operative to compare the digital signals from said source and said delay means, said digital comparator including an exclusive-or gate circuit operative to produce an output signal in response to anti-coincidence of pulses in the same relative positions of pulses from said delay means and said source, and means for detecting output signals from said comparator circuit.

References Cited in the file of this patent

UNITED STATES PATENTS

| | | |
|---|---|---|
| 2,236,134 | Gloess | Mar. 25, 1941 |
| 2,403,561 | Smith | July 9, 1946 |
| 2,493,543 | Merchant | Jan. 3, 1950 |
| 2,609,143 | Stibitz | Sept. 2, 1952 |
| 2,628,346 | Burkhart | Feb. 10, 1953 |
| 2,636,133 | Hussey | Apr. 21, 1953 |
| 2,679,034 | Albrighton | May 18, 1954 |
| 2,756,409 | Lubkin | July 24, 1956 |
| 2,785,305 | Crooks et al. | Mar. 12, 1957 |
| 2,789,267 | Beal et al. | Apr. 16, 1957 |
| 2,870,430 | Hancock | Jan. 20, 1959 |
| 2,871,289 | Cox et al. | Jan. 27, 1959 |